(12) United States Patent
Palmbos et al.

(10) Patent No.: US 9,120,130 B2
(45) Date of Patent: Sep. 1, 2015

(54) SORTING APPARATUS

(71) Applicant: Lakewood Process Machinery, Holland, MI (US)

(72) Inventors: Kurt Palmbos, Zeeland, MI (US); Dennis Schepel, Holland, MI (US)

(73) Assignee: Lakewood Process Machinery, Holland, MI (US)

( * ) Notice: Subject to any disclaimer, the term of this patent is extended or adjusted under 35 U.S.C. 154(b) by 100 days.

(21) Appl. No.: 13/953,544

(22) Filed: Jul. 29, 2013

(65) Prior Publication Data

US 2015/0027935 A1    Jan. 29, 2015

(51) Int. Cl.
*B07B 13/075* (2006.01)
*A23N 15/00* (2006.01)
*B07B 1/14* (2006.01)
*B07B 1/46* (2006.01)
*B07B 13/04* (2006.01)

(52) U.S. Cl.
CPC .............. *B07B 13/075* (2013.01); *A23N 15/00* (2013.01); *B07B 1/14* (2013.01); *B07B 1/4636* (2013.01); *A23N 2015/008* (2013.01); *B07B 13/04* (2013.01)

(58) Field of Classification Search
CPC ............ B07B 1/14; B07B 1/15; B07B 1/155; B07B 13/07; B07B 13/072; B07B 13/075; B07B 13/065
USPC ........................................................ 209/668
See application file for complete search history.

(56) References Cited

U.S. PATENT DOCUMENTS

| | | | | |
|---|---|---|---|---|
| 3,561,597 | A * | 2/1971 | Youngblood | 209/622 |
| 4,364,479 | A * | 12/1982 | Sardo | 209/668 |
| 5,143,226 | A * | 9/1992 | Walton | 209/624 |
| 6,182,832 | B1 * | 2/2001 | Mauduit et al. | 209/624 |
| 7,117,996 | B1 * | 10/2006 | Mobley et al. | 209/668 |
| 2001/0037961 | A1 * | 11/2001 | Sardo | 209/622 |
| 2014/0197081 | A1 * | 7/2014 | Nilson | 209/668 |

* cited by examiner

*Primary Examiner* — Jeremy R Severson
(74) *Attorney, Agent, or Firm* — The Watson I.P. Group, PLC; Jovan N. Jovanovic; Vlada M. Vasiljevic

(57) ABSTRACT

A sorting apparatus comprising a frame, a sorting surface assembly, a roller control assembly, a first movable cam surface adjustment assembly and a drive assembly. The sorting apparatus is configured, through adjustment of the sorting surface by the roller control assembly, to separate small particles and articles, such as fruit berries, based on the relative size thereof.

15 Claims, 12 Drawing Sheets

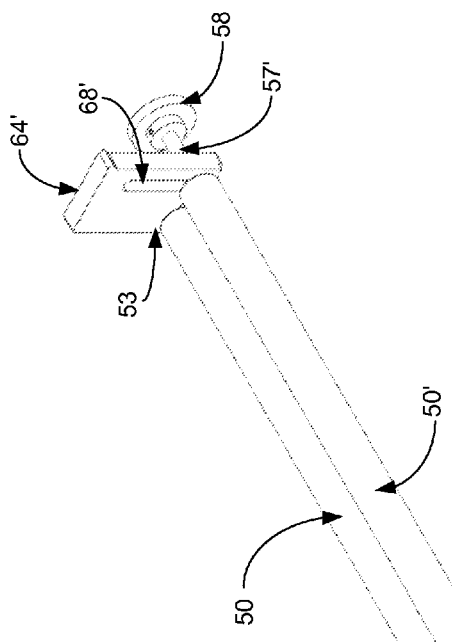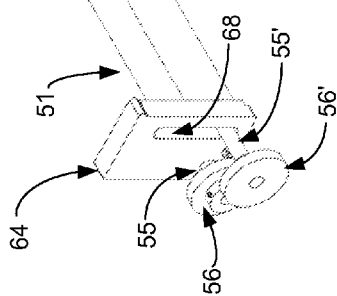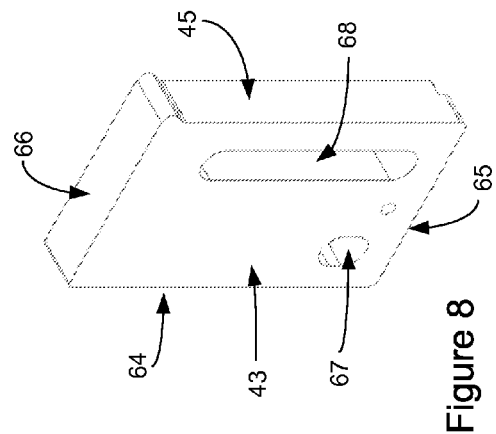
Figure 6
Figure 8

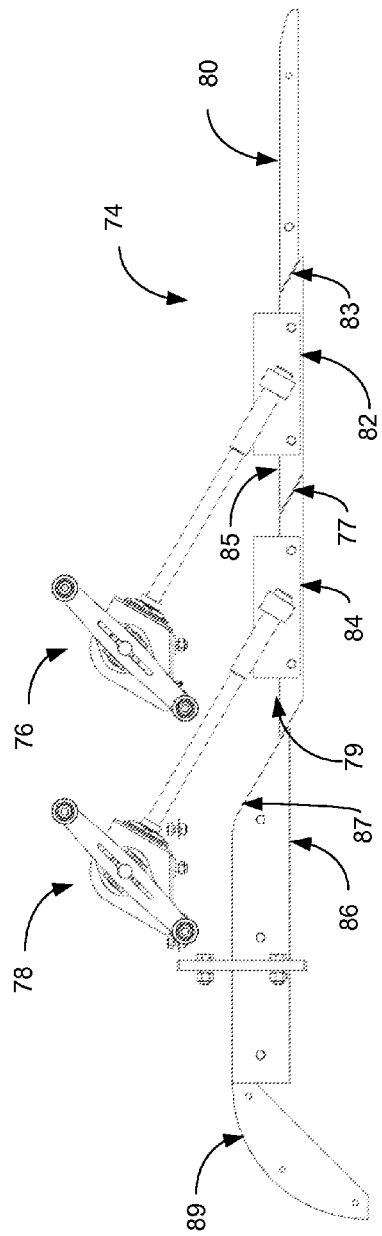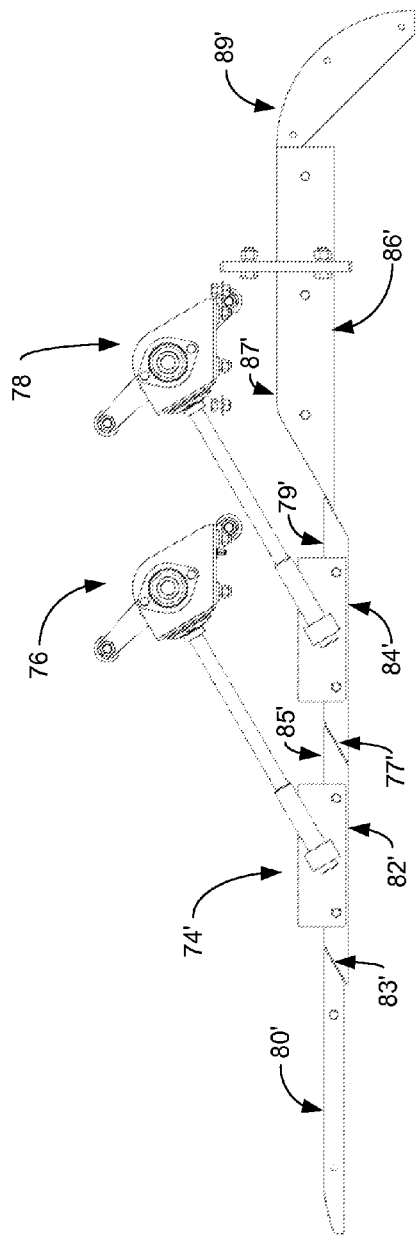

SORTING APPARATUS

CROSS-REFERENCE TO RELATED APPLICATION

NA

BACKGROUND OF THE DISCLOSURE

1. Field of the Disclosure

The invention relates in general to a sorting apparatus, and more particularly, to a sorting apparatus which is particularly useful for sorting fruit among a plurality of different sizes. While not limited to fruit or any particular item, the apparatus is well suited for the sorting of berries, such as blueberries, blackberries, raspberries and the like. Of course, the apparatus can be used for the sorting of other items as well.

2. Background Art

The use of different sorting equipment is known in the art. As is often the case with small berries and the like, it is advantageous to be able to separate differently sized berries. That is, a certain size, or plurality of sizes, of berries is desirable. To achieve the same, it is typically necessary to process berries on several different conveyors or sorters, with each conveyor or sorter being able to separate berries of a certain size. Problematically, such a process is time consuming as a plurality of conveyors or sorters are required.

In other embodiments, it is difficult to adjust the sorters to capture and sort a particular size of berries, then, through a quick adjustment, a differently sized berry. It would be advantageous to be able to separate multiple different sizes in a single conveyor and sorter, and, to be able to adjust the sorter for differently sized berries.

It would be advantageous to provide an improved sorting apparatus for articles, and in particular, for articles such as fruit berries and the like (without being limited thereto).

SUMMARY OF THE DISCLOSURE

The disclosure is directed to a sorting apparatus comprising a frame, a sorting surface assembly, a roller control assembly, a first movable cam surface adjustment assembly and a drive assembly. The frame has a first side and a second side spaced apart from the first side. Each of the first and second sides having a first end and a second end. The frame defining an upper opening spanning between the first and second sides. The sorting surface assembly comprising a plurality of roller members, defining alternating first roller members and second roller members. Each one of the plurality of roller members consecutively positioned so as to extend between the first and second sides. The roller members are also substantially parallel to each other, and spanning across the upper cavity. Each of the plurality of roller members having a first end and a second end. A first follower roller is coupled to the first end and a second follower roller is coupled to the second end.

The roller control assembly includes a first fixed cam surface positioned along the first side of the frame, that extends between the first and second ends of the frame. A second fixed cam surface is positioned along the second side of the frame and extends between the first and second ends of the frame. A first side first movable cam surface is positioned along the first side of the frame, extending between the first and second ends of the frame. A second side first movable cam surface positioned along the second side of the frame, extending between the first and second ends of the frame. The first side first movable cam surface includes a first movable cam surface, and the second side first movable cam surface includes a first movable cam surface, substantially corresponding to the first movable cam surface of the first side first movable cam surface.

It will be understood that the first follower roller of each of the plurality of first roller members is associated with the first fixed cam surface. The second follower roller of each of the plurality of first roller members is associated with the second fixed cam surface. The first follower roller of each of the plurality of second roller members is associated with the first movable cam surface. The second follower roller of each of the plurality of second roller members is associated with the second movable cam surface.

The first movable cam surface adjustment assembly is coupled to the first side first movable cam surface and the second side first movable cam surface. The first movable cam surface adjustment assembly is configured to move the first side first movable cam surface and the second side first movable cam surface so as to alter the position of the second roller members having respective first and second followers on the first and second side first movable cam surfaces. Such a configuration, in turn, alters the spacing between adjacent first and second follower members.

A drive assembly is configured to translate the plurality of first roller members and second roller members across the upper opening from the first side to the second side.

In a preferred embodiment, the drive assembly further comprises a first drive belt and a second drive belt. The first drive belt is positioned on the first side with a portion of the first drive belt extending along the frame from the first end to the second end thereof and proximate the first fixed cam surface. The first end of each of the plurality of first and second roller members are coupled to the first drive belt. Movement of the first drive belt translates the first and second roller members across the upper opening from the first end to the second end of the frame.

In such embodiments, the second drive belt is positioned on the second side with a portion of the second drive belt extending along the frame from the first end to the second end thereof proximate the second fixed cam surface. The second end of each of the plurality of first and second roller members is coupled to the second drive belt. Movement of the second drive belt translates the first and second roller members across the opening from the first end to the second end of the frame.

In a preferred embodiment, the first and second drive belts move in unison with each other.

In another preferred embodiment, the drive assembly further comprises a plurality of coupling blocks associated with the first drive belt and a plurality of coupling blocks associated with the second drive belt. The plurality of coupling blocks extending from the first drive belt each being positioned in a side by side orientation along the entirety of the second belt, and each of these coupling blocks having a fixed axle opening capturing the first end of a successive first roller member, and an elongated axle opening. The elongated axle opening extending in a direction away from the drive belt capturing the first end of each of the second roller members. The plurality of coupling blocks extending from the second drive belt are each positioned in a side by side orientation along the entirety of the second belt, and correspond to the coupling blocks of the first belt. Each of these coupling blocks have a fixed axle opening capturing the second end of a successive first roller member, and an elongated axle opening which extends in a direction away from the drive belt capturing the second end of each of the second roller members.

In another preferred embodiment, the elongated axle opening of the plurality of coupling blocks extends substantially perpendicular to the belt proximate the coupling block.

Preferably, the first movable cam surface adjustment assembly is configured to move the first side first movable cam surface upwardly from the first side fixed cam surface. The second side first movable cam surface is positioned upwardly from the second side fixed cam surface.

In another preferred embodiment, each of the first and second roller members including an outer surface which includes a plurality of extending ribs and surface indentations positioned in an alternating configuration. The extending ribs of each of the first and second roller members substantially corresponding to each other. Thus, the surface indentations of adjacent first and second roller members define a passageway therebetween. The movement of the first side first movable cam surface and the movement of the second side first movable cam surface altering a size of the passageway therebetween.

In another preferred embodiment, the first movable cam surface adjustment assembly comprises an adjustment axle, a first adjustment arm and a second adjustment arm. The adjustment axle is rotatably positioned relative to the frame. The adjustment axle includes a first gear and a second gear. The first gear is positioned proximate the first side and the second gear positioned proximate the second side. The first adjustment arm includes a first end including a gear configured to matingly mesh with the first gear of the adjustment arm. The second end is spaced apart therefrom and coupled to the first side first movable cam surface. Rotation of the first adjustment arm corresponds to translative movement of the first side first movable cam surface;

In such an embodiment, a second adjustment arm has a first end including a gear configured to matingly mesh with the second gear of the adjustment arm and a second end spaced apart therefrom. The second end is coupled to the second side first movable cam surface. Rotation of the second adjustment arm corresponds to translative movement of the second side first movable cam surface.

In another preferred embodiment, the first adjustment arm comprises a first telescoping component having the gear positioned at the first end thereof, and a second telescoping component having a second end coupled to the first side first movable cam surface. The second end of the first telescoping component is rotatably coupled to the first end of the second telescoping component. As a result, relative rotation of the first telescoping component translates the first telescoping component relative to the second telescoping component, thereby changing the length of the first adjustment arm.

In such an embodiment, the second adjustment arm comprises a first telescoping component having the gear positioned at the first end thereof, and a second telescoping component having a second end coupled to the second side first movable cam surface. The second end of the first telescoping component is rotatably coupled to the first end of the second telescoping component. As a result, relative rotation of the first telescoping component translates the first telescoping component relative to the second telescoping component, thereby changing the length of the second adjustment arm.

In some such embodiments, the first side of the frame further includes a pair of slots extending therethrough. The pair of slots extend in an upward direction. A first plate is coupled to the first side first movable cam surface by way of a pair of pins. Each pin extends through one of the pair of slots in the first side of the frame. The second end of the second telescoping component is coupled to the first plate and movable therewith. Rotational movement of the first telescoping component of the first adjustment arm moves the first plate, and in turn, the pins along the pair of slots.

In such embodiments, the second side of the frame includes a pair of slots extending therethrough. The pair of slots extend in an upward direction, and further include a second plate that is coupled to the second side first movable cam surface by way of a pair of pins. Each pin extends through one of the pair of slots in the second side of the frame. The second end of the second telescoping component is coupled to the second plate and movable therewith. Rotational movement of the first telescoping component of the second adjustment arm moves the second plate, and in turn, the pins along the pair of slots.

In some such embodiments, the apparatus further includes a transport chute assembly having a belt chute assembly extending below the roller members extending along the first side first movable cam surface and the second side first movable cam surface. The belt chute assembly extends toward one of the first and second sides of the frame.

In some such embodiments, the belt chute assembly extends beyond the first side of the frame, through a central opening defined in the first side of the frame, and in a direction that is at least one of oblique to and perpendicular to the movement of the roller members across the upper opening.

In another preferred embodiment, the apparatus further comprises a first side introductory cam surface which is fixed to the frame and precedes the first side first movable cam surface. Additionally, a second side introductory cam surface is fixed to the frame and precedes the second side first movable cam surface.

In another embodiment, the apparatus further comprises a first side conclusory cam surface which is fixed to the frame and follows the first side first movable cam surface. Additionally, a second side conclusory cam surface is fixed to the frame and follows the second side first movable cam surface.

In another preferred embodiment, the roller control assembly further comprises a first side second movable cam surface positioned sequentially after the first side first movable cam surface. A second side second movable cam surface is positioned sequentially after the second side first movable cam surface. Additionally, the sorting apparatus further comprises a second movable cam surface adjustment assembly coupled to the first side second movable cam surface and coupled to the second side second movable cam surface. Such a configuration can alter the position of the second roller members having respective first and second followers, so as to alter the spacing between adjacent first and second follower members.

In another preferred embodiment, the second movable cam surface adjustment assembly comprises an adjustment axle, a first adjustment arm and a second adjustment arm. The adjustment axle is rotatably positioned relative to the frame, and includes a first gear and a second gear. The first gear is positioned proximate the first side and the second gear positioned proximate the second side. The first adjustment arm has a first end including a gear configured to matingly mesh with the first gear of the adjustment arm. A second end is spaced apart therefrom and coupled to the first side second movable cam surface. Rotation of the first adjustment arm corresponds to translative movement of the first side second movable cam surface. The second adjustment arm has a first end including a gear configured to matingly mesh with the second gear of the adjustment arm. A second end is spaced apart therefrom and coupled to the second side second movable cam surface. Rotation of the second adjustment arm corresponds to translative movement of the second side second movable cam surface In a preferred embodiment, the first adjustment arm comprises a first telescoping component having the gear positioned at the first end thereof. A second telescoping component has a second end coupled to the first side second movable cam surface. The second end of the first telescoping component is rotatably coupled to the first end of the second telescoping component. Relative rotation of the first telescoping component translates the first telescoping component relative to the second telescoping component, thereby changing the length of the first adjustment arm.

In such an embodiment, the second adjustment arm comprises a first telescoping component having the gear positioned at the first end thereof. A second telescoping component has a second end coupled to the second side second movable cam surface. The second end of the first telescoping component is rotatably coupled to the first end of the second telescoping component. As a result, relative rotation of the first telescoping component translates the first telescoping component relative to the second telescoping component, thereby changing the length of the second adjustment arm.

In some preferred embodiments, the apparatus further comprises a transport chute assembly having a belt chute assembly extending below the roller members and extending along the first side second movable cam surface and the second side second movable cam surface. The belt chute assembly extends toward one of the first and second sides of the frame.

BRIEF DESCRIPTION OF THE DRAWINGS

The disclosure will now be described with reference to the drawings wherein:

FIG. 6 of the drawings is a perspective view of adjacent roller members along with the coupling blocks associated with the adjacent roller members;

FIG. 8 of the drawings is a perspective view of a coupling block of the drive assembly of the present disclosure;

FIG. 11 of the drawings is a side elevational view of the roller control assembly of the present disclosure;

FIG. 12 of the drawings is a side elevational view of the roller control assembly of the present disclosure;

DETAILED DESCRIPTION OF THE DISCLOSURE

Figure 1:
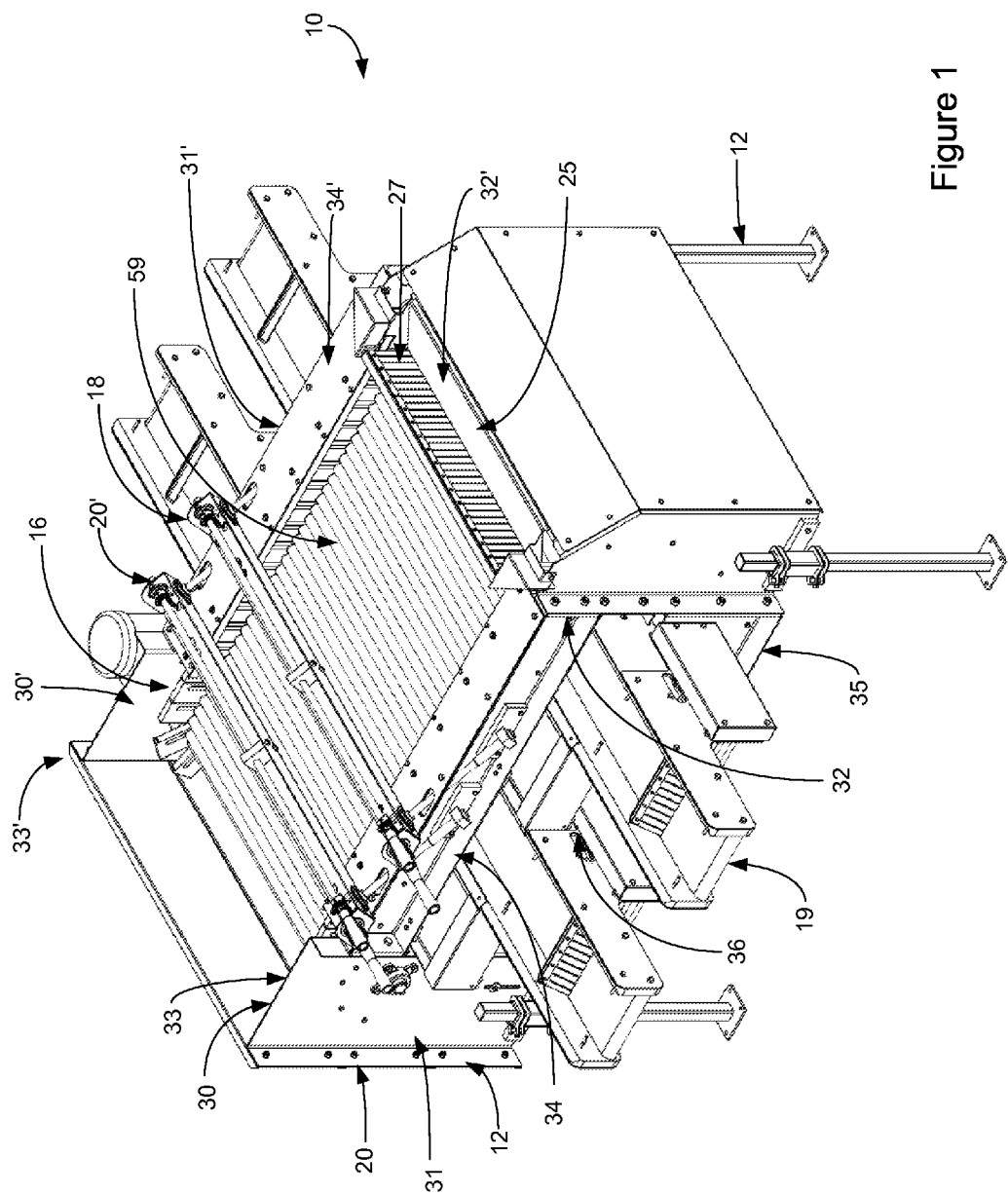
FIG. 1 of the drawings is a perspective view of the sorting apparatus of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
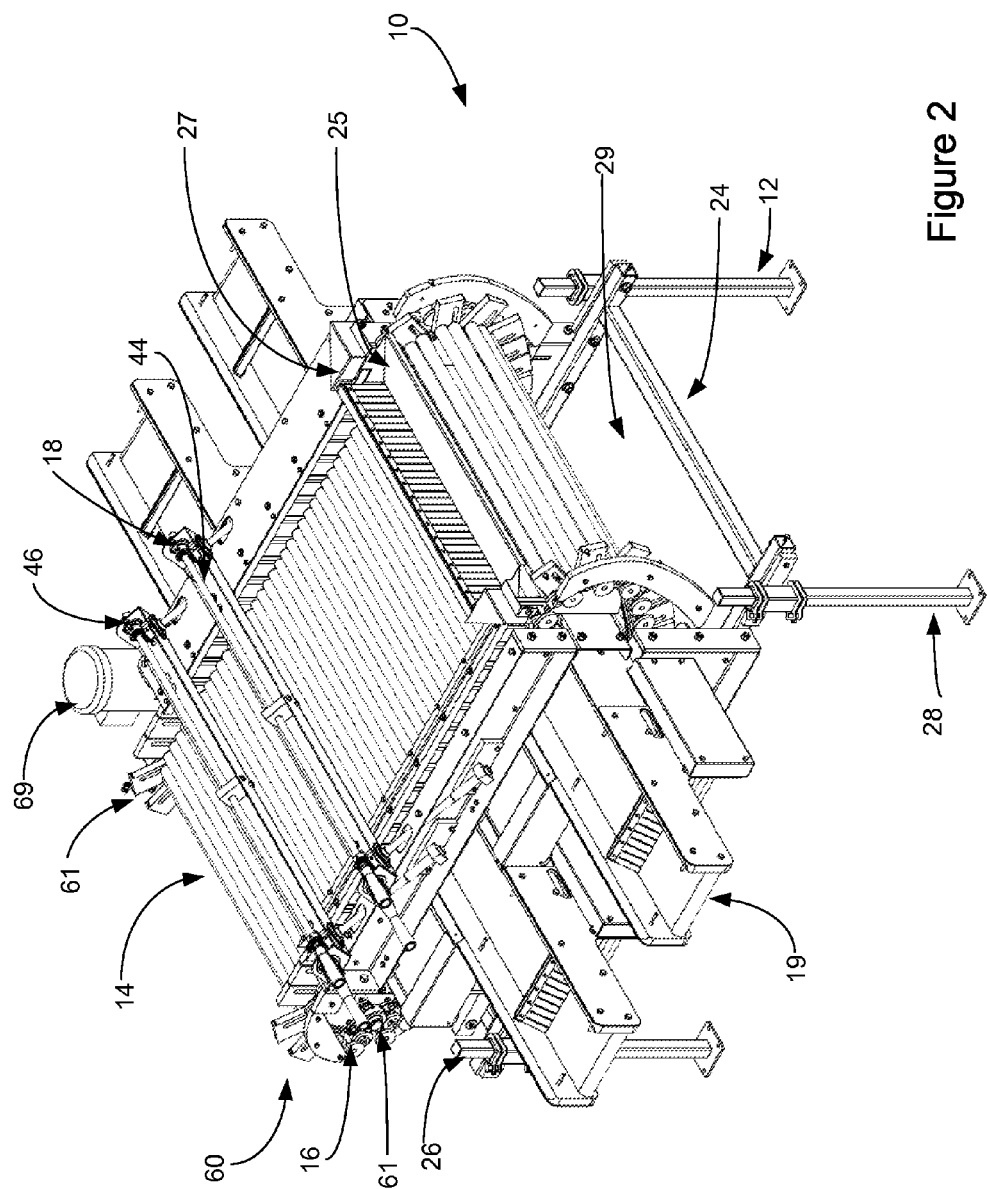
FIG. 2 of the drawings is a perspective view of the sorting apparatus of the present disclosure, showing the frame, with the covering panels removed.
Figure 3:
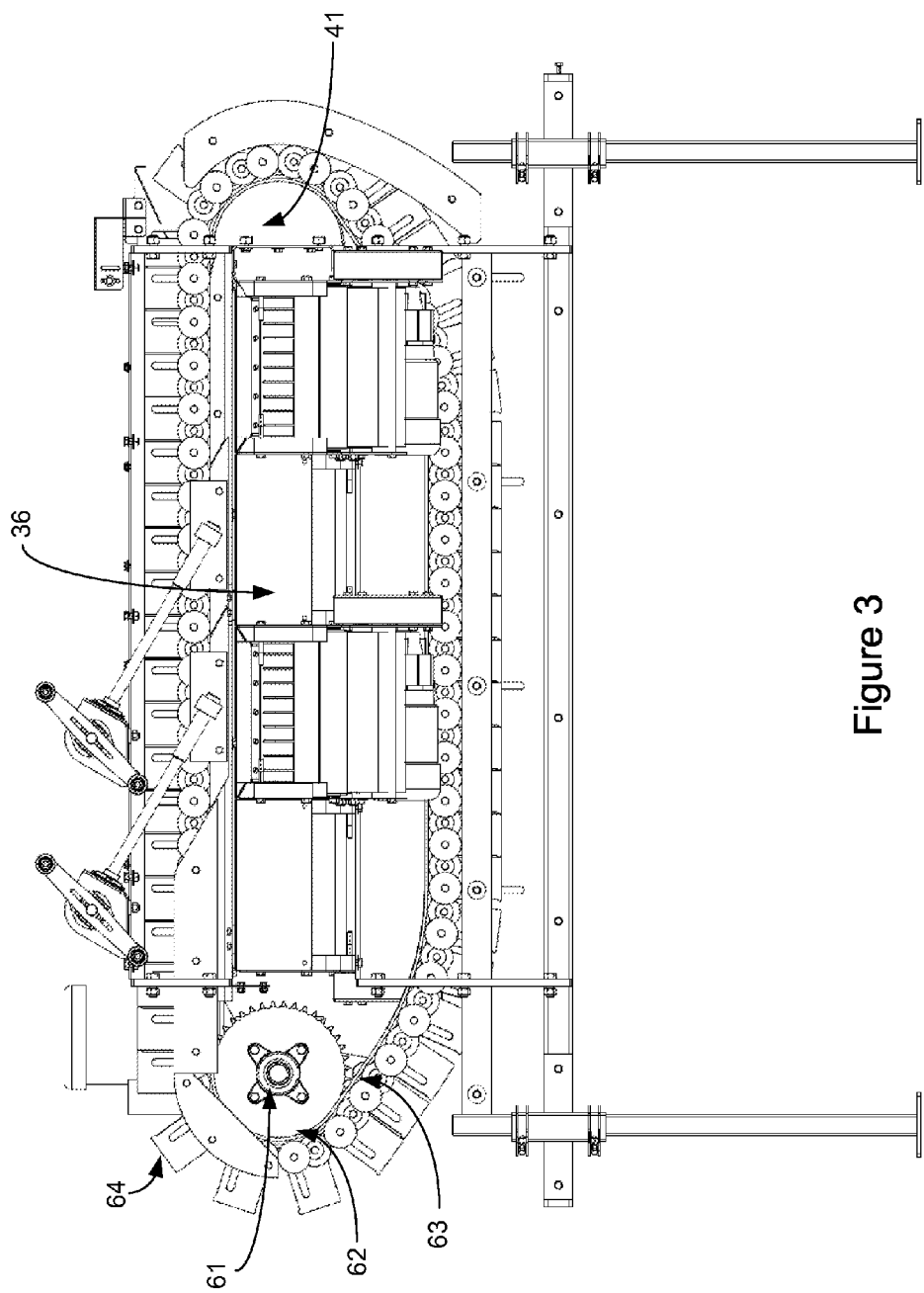
FIG. 3 of the drawings is a side elevational view of the sorting apparatus of the present disclosure, with covering panels removed, showing, in particular, the movement of the belt on the first side of the apparatus.

Referring now to the drawings and in particular to FIGS. 1 and 2, the sorting apparatus 10 is shown as comprising frame 12, sorting surface assembly 14, drive assembly 16, roller control assembly 18 and transport chute assembly 19. It will be understood that the particular apparatus is generally associated with a piece of equipment (or manual labor) that can provide a supply of the articles to be sorted (i.e., fruit, and of particular interest, berries). Preferably, the supply of articles to be sorted can be provided on a substantially regular schedule, such that the sorting can be achieved in an efficient manner. At the outlets of the transport chute assembly, additional transport can be provided to container filling equipment so as to fill containers with the sorted articles. Such equipment is known to those of skill in the art.

The frame 12 is shown in FIGS. 1 and 2 as comprising a housing to isolate moving equipment and for purposes of containment, with the housing including a plurality of panels encasing the apparatus. The frame includes a first side 20 and a second side 20', as well as first end 24, second end 26, all of which define a cavity 29. The first side 20 is a substantial mirror image of the second side, and, as such, the first side will be described with the understanding that the second side is substantially identical, with like structures having the same reference number, augmented by a prime ('). The frame 12 also includes leg members 28 which are adjustable and which provide a means by which to maintain the remainder of the frame at a desired distance from the ground.

The first side 20 includes inside surface 30, outside surface 31, first end 32, second end 33, upper cross member 34 and lower cross member 35. The upper and lower cross members as well as the first and second ends define a central opening 36 (through which the transport chute assemblies extend). The general framework can be augmented with sheet material to provide a housing. Such housing sheet material may comprise metal members, or may comprise both opaque, and transparent sheet members.

Figure 4:
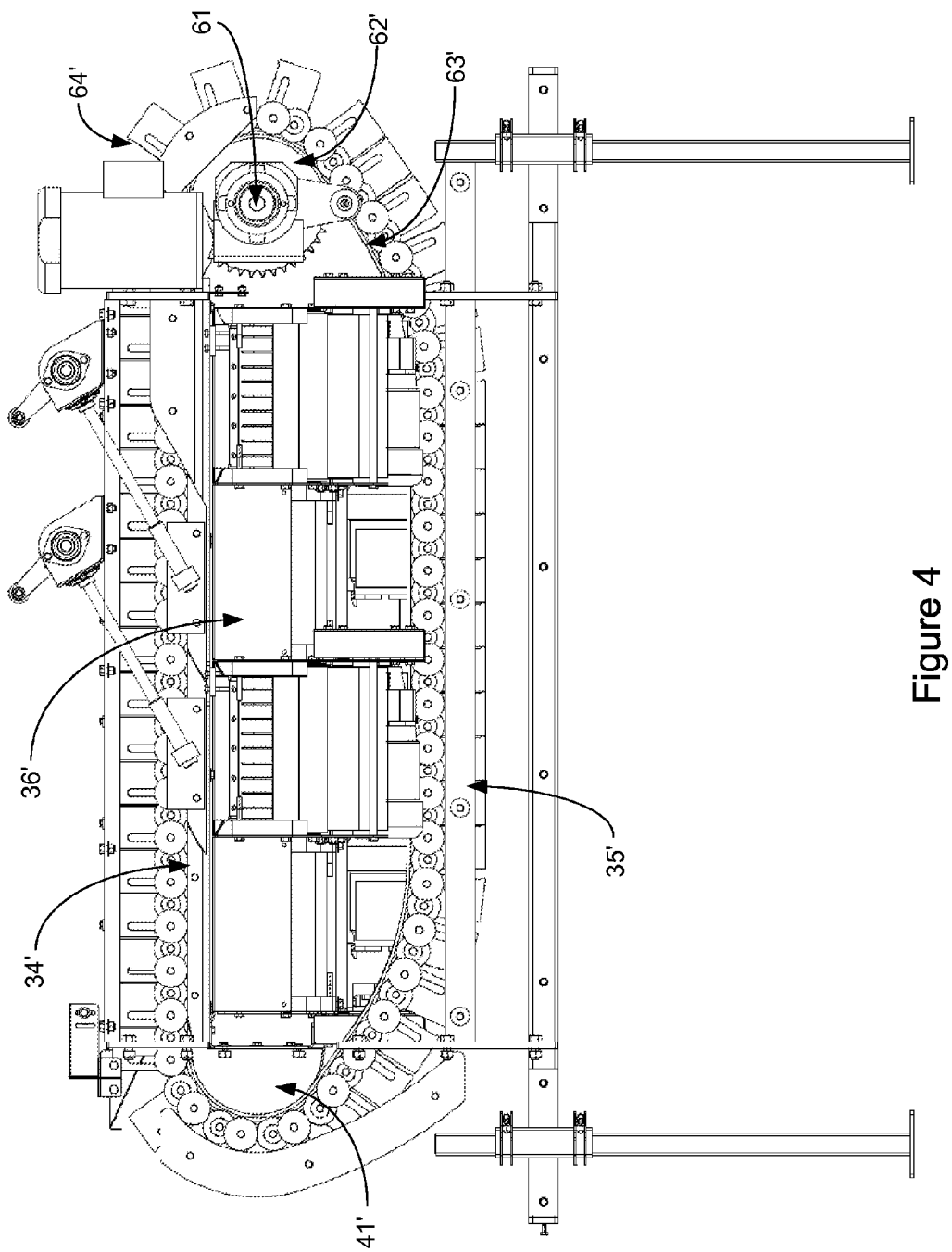
FIG. 4 of the drawings is a side elevational view of the sorting apparatus of the present disclosure, with covering panels removed, showing, in particular, the movement of the belt on the second side of the apparatus.
Figure 5:
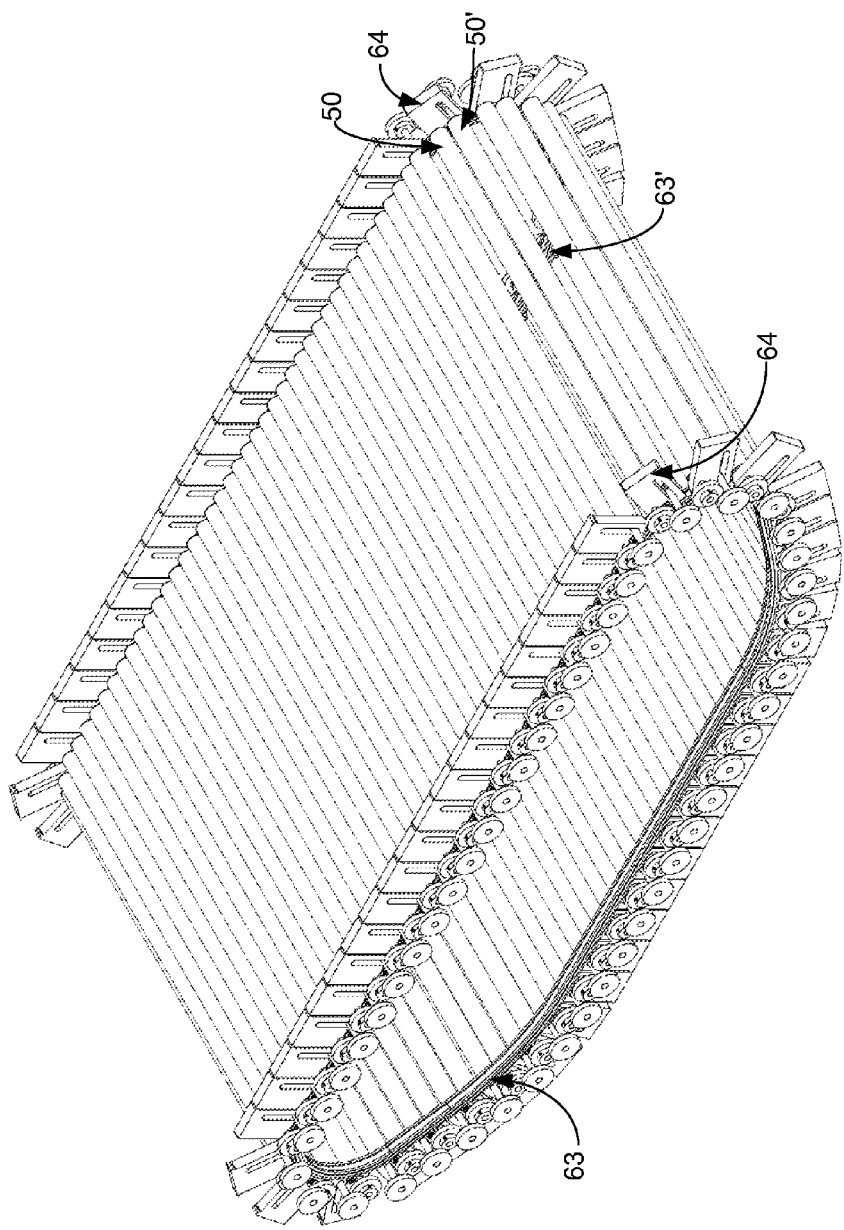
FIG. 5 of the drawings is a perspective view of the sorting surface assembly, along with the drive belt and the coupling blocks of the drive assembly.
Figure 7:
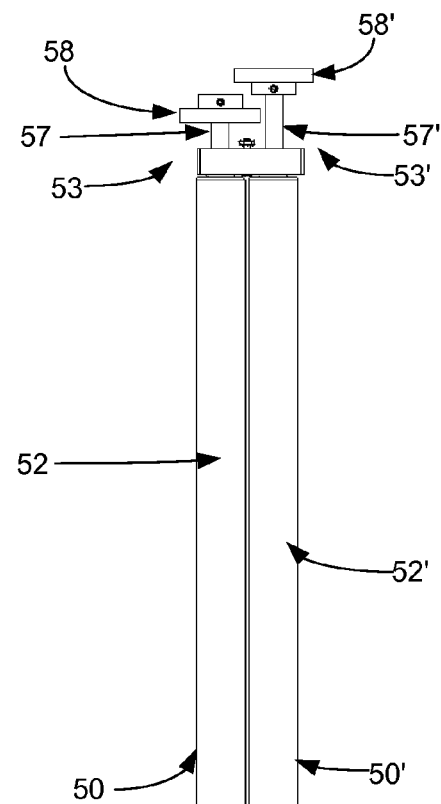
FIG. 7 of the drawings is a top plan view of adjacent roller members along with the coupling blocks associated with the adjacent roller members.
Figure 9:
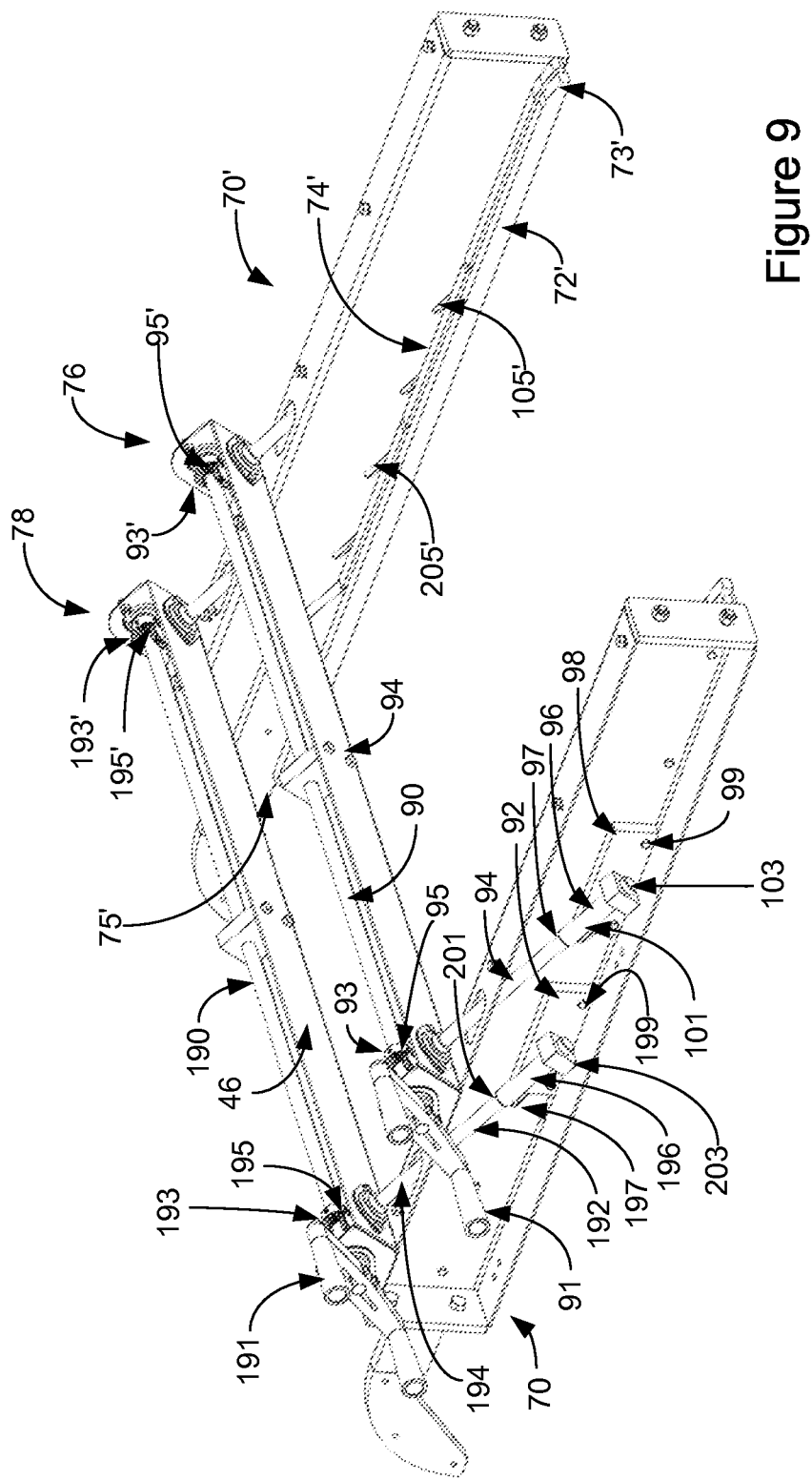
FIG. 9 of the drawings is a perspective view of the roller control assembly of the present disclosure.
Figure 10:
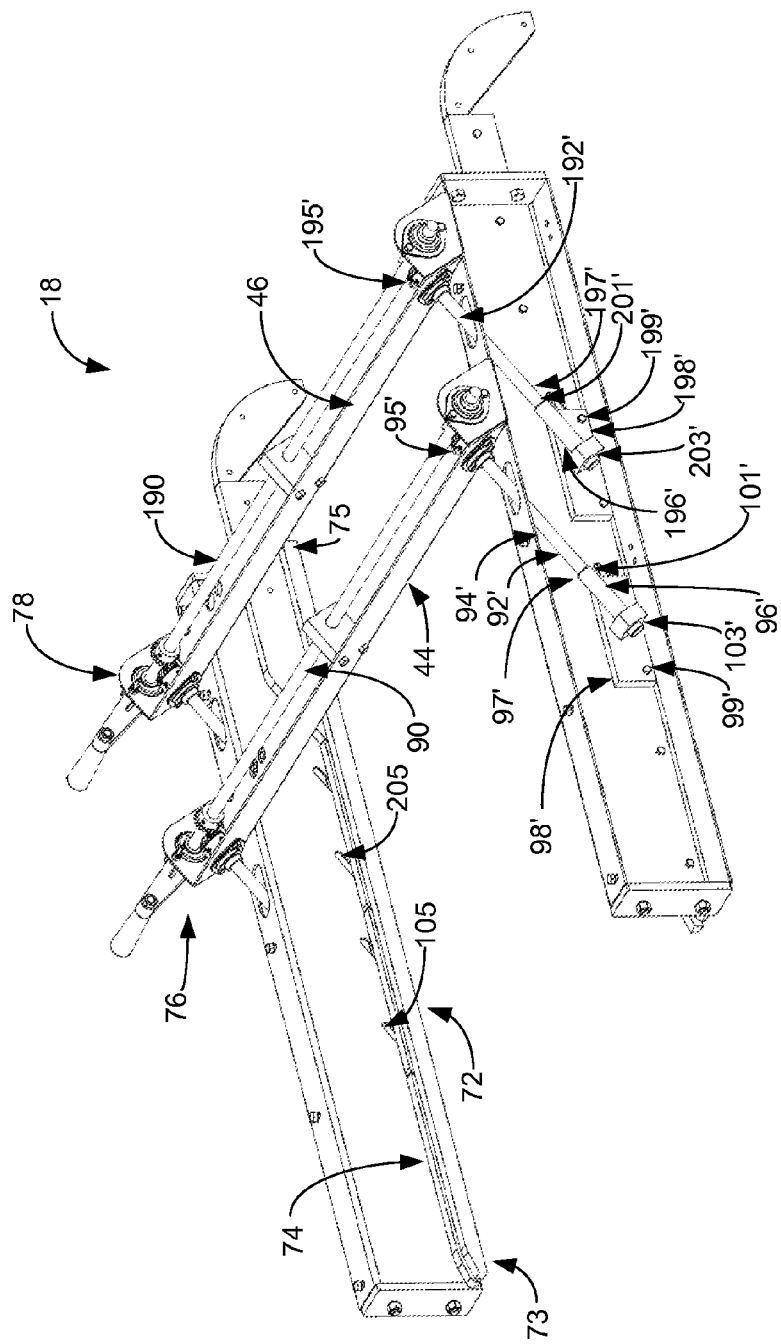
FIG. 10 of the drawings is a perspective view of the roller control assembly of the present disclosure.
Figure 13:
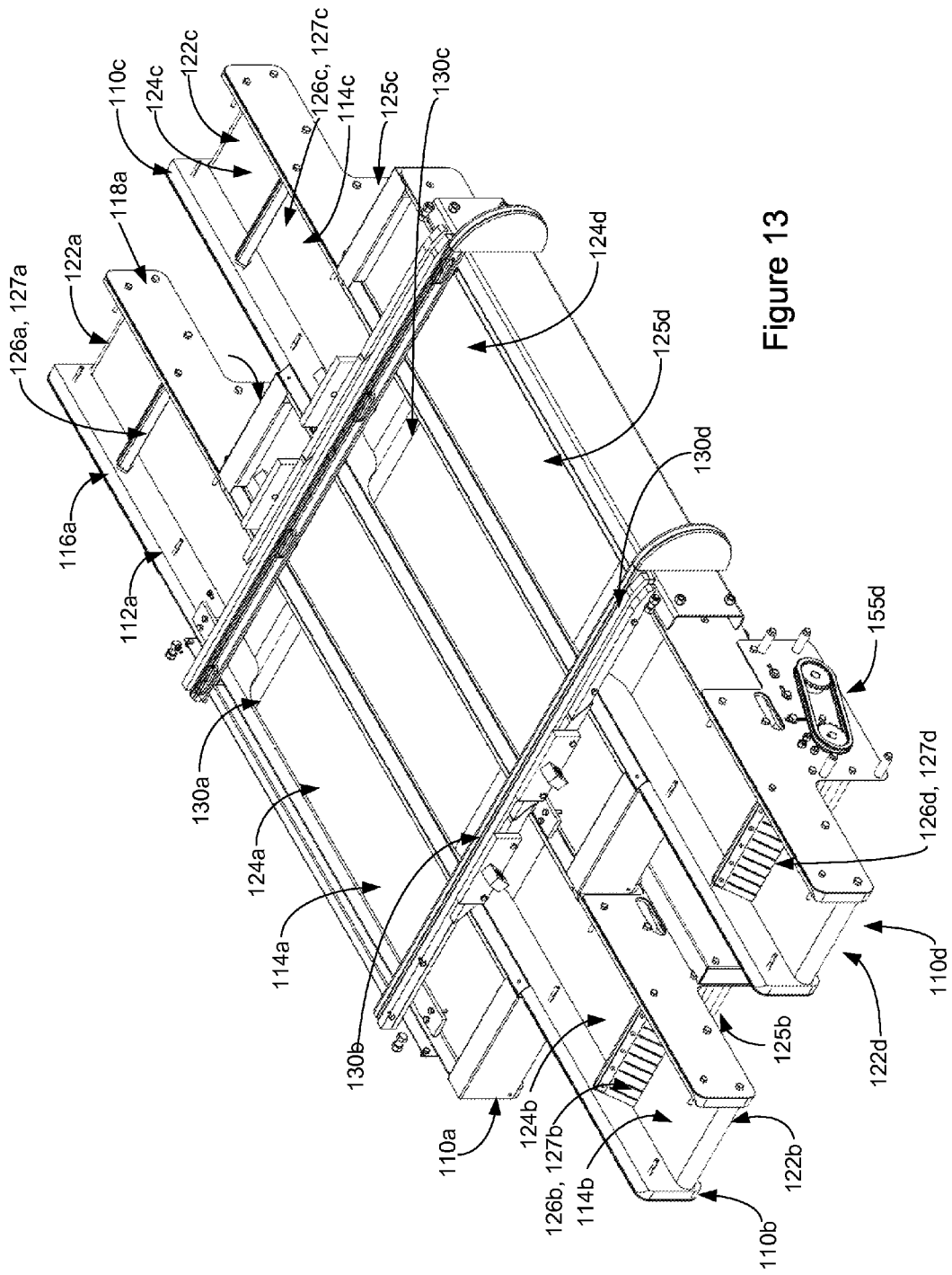
FIG. 13 of the drawings is a perspective view of the transport chute assembly of the present disclosure.
Figure 14:
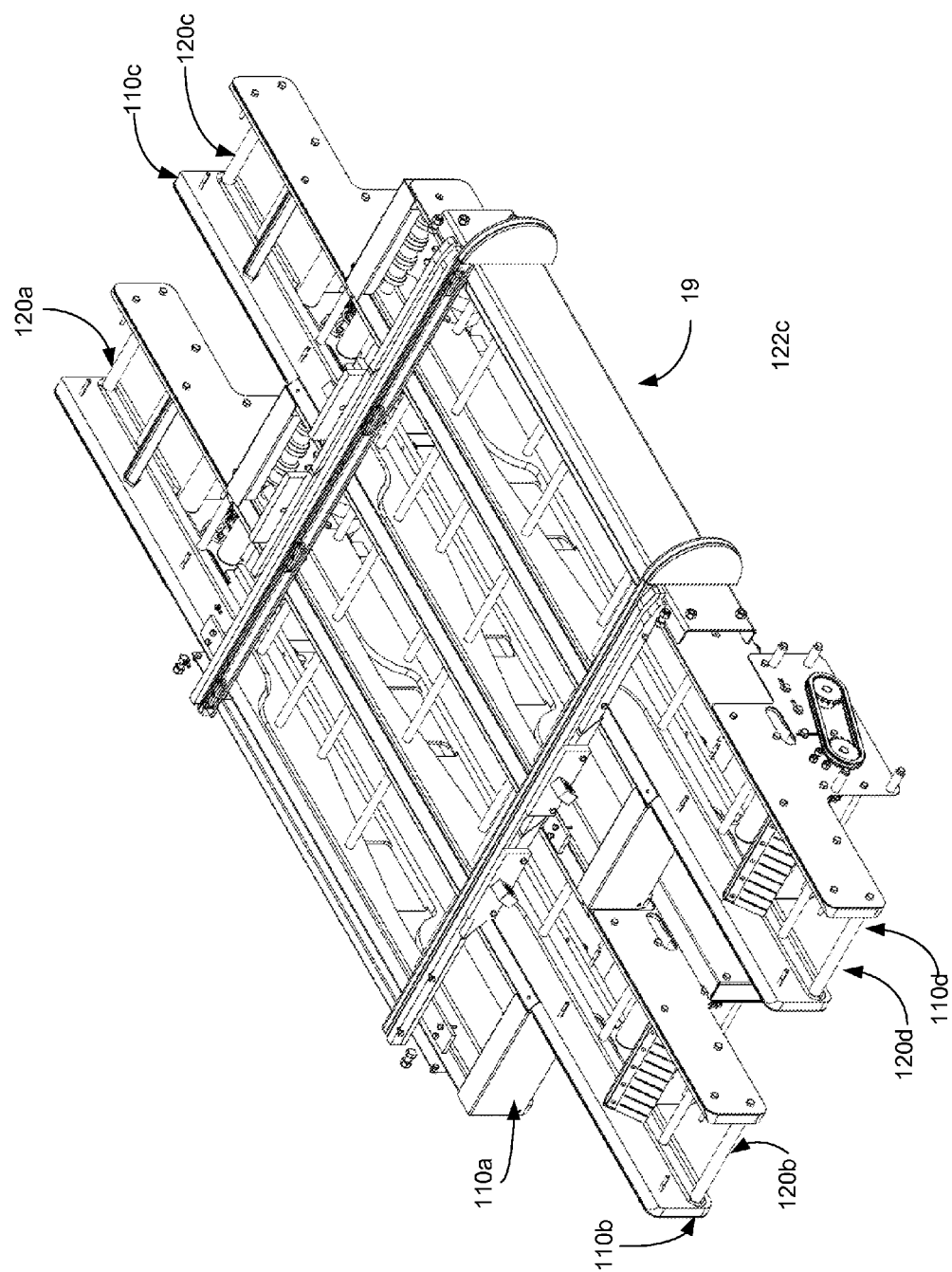
FIG. 14 of the drawings is a perspective view of the transport chute assembly of the present disclosure.

The second side 20' includes inside surface 30', outside surface 31', first end 32', second end 33', an upper cross member 34'(FIG. 4) and lower cross member 35' (FIG. 4). The upper and lower cross members as well as the first and second ends define a central opening 36' (through which the transport chute assemblies extend). The general framework can be augmented with sheet material to provide a housing. Such housing sheet material may comprise metal members, or may comprise both opaque, and transparent sheet members. In the embodiment shown, the first and second side are substantially mirror images of each other. It will be understood in such an embodiment, the motor that drives the drive assembly is positioned on the second side 20', and, as such, there may be some variation between the two to, for example, accommodate the same. Additionally, while two belt chute assemblies 110 are shown as extending through each one of the central openings 36, 36' of the first side 20 and the second side 20', respectively, it will be understood that in other embodiments the chutes may be on one side only, or may have different configurations between the first side and the second side. In such embodiments, there may be further differences between the two sides.

The first end 24 comprises a plurality of beams that extend between the sides so as to provide a fixing of the sides relative to each other, and to also provide support and attachment points for the other equipment housed within the frame. The same is true of the second end 26 which likewise comprises a plurality of beams that extend between the sides. Additionally, sheet material may be coupled to these members as well to provide a housing between the sides at either end. At the upper end, the frame defines an upper opening 59.

A product entry chute 25 can be provided at the first end 24 in the form of an inclined surface with an outlet 27. The outlet 27 may be covered with a covering having a plurality of slits extending therethrough which cooperatively define a number of side by side flaps. These flaps allow the articles to pass through the outlet, while, nevertheless, minimizing bouncing and uncontrolled exiting from the outlet. In addition, these flaps tend to force the articles downwardly toward the surface of the roller members 50, 50'. A cover may be provided over the inclined member, thereby defining an inlet. Such a cover prevents the inadvertent introduction of material that is any one of undesired, inadvertent or otherwise problematic.

The sorting surface assembly 14 is shown in FIGS. 3 through 8 and comprises a number of roller members, such as roller member 50 and roller member 50'. The roller members 50, as will be explained, roll rotate about an axis of rotation while extending along the upper opening 59. Each roller member 50 extends from first end 51 to second end 49. The roller member includes an outer surface 52, which, in the article contact area, includes a plurality of configurations that alternate between surface indentations 53 and extending ribs 54. The surface indentations generally comprise a slot that is generally of uniform depth and of a particular desired width. The ribs define the separation between the slots. At the first end 51, a first axle 55 extends therefrom, with a first follower roller 56 positioned so as to be spaced apart from the article contact area of the outer surface. At the second end 49, a second axle 57 extends therefrom, with a second follower roller 58 positioned so as to be spaced apart from the article contact area of the outer surface.

The configuration of the roller member 50' is substantially identical, with the exception that the first and second follower rollers 56' and 58' are spaced apart from the article contact area of the outer surface further than the corresponding follower rollers 56, 58. Generally, however, the outer surface 52' of the roller member 50' is substantially identical to that of the roller member 50. The rollers are generally formed from a substantially rigid polymer member, or metal member. In certain embodiments, a stainless steel material is contemplated for use. As will be explained, the roller members are positioned in sequential order with the axis of the first and second axles being substantially parallel to each other, and spaced apart from each other so that the extending ribs generally match up and are a short distance apart from each other. Of course, it is contemplated that, depending on the article, a different spacing can be set, as desired. Additionally, and as will be explained below with particular reference to the roller controller assembly, the rollers are positioned so as to alternate between roller member 50 and roller member 50'.

The roller members collectively extend between the first side 20 and the second side 20', spanning across an upper opening 59 that is defined between the two sides and the two ends. Additionally, the roller members collectively form a sorting surface which generally spans across the upper opening 59. It will be understood that the openings between the adjacent roller members, and due to the surface variations in the adjacent roller members, serve to provide an outlet for different articles to pass through the sorting surface. It is the control of the size of these openings which provides for the sorting of the articles based upon the size thereof.

With reference to FIG. 2, the drive assembly 16 includes first side drive 60 and second side drive 60'. The first side drive and the second side drive are substantially identical in configuration and are driven by a common drive axle 61 which is coupled to a drive motor 69. The first side drive 60 will be described in detail with the understanding that the second side drive is substantially identical to the first side drive, with similar components identified with the same reference number, augmented by a prime ('). The first drive 60 includes drive sprocket 62 which is coupled to the drive axle 61. The drive belt 63 extends about the drive sprocket 62, and idler slide 41 positioned on the opposite side of the central opening 36. The drive belt follows a path that extends around the central opening 36.

The drive belt 63 further includes a plurality of coupling blocks 64 extending along the outside surface of the drive belt. The coupling blocks 64 are positioned in a side by side orientation extending about the block such that they substantially abut each other when the belt is substantially planar. With reference to FIG. 8, each coupling block 64 includes a bottom end 65, top end 66, outside surface 43 and inside surface 45. A fixed axle opening 67 extends through the coupling block between the top and bottom ends. Additionally, an elongated axle opening 68 extends between the top and bottom ends, with the bottom of the elongated axle opening substantially corresponding to the position of the fixed axle opening 67. The elongated axle opening extends substantially perpendicular to the belt positioned at the bottom end 65 of the coupling block 64. The elongated axle opening and the fixed axle opening are in a generally side by side orientation.

In the embodiment shown, the drive belt includes a plurality of outwardly extending lugs on opposing edges of the belt, each having an opening. The opening can accommodate a fastener that can then sandwich the coupling block between the lugs. In other embodiments, the coupling blocks may be co-molded with the belt, or otherwise integrated therewith. In still other embodiments, other manners of attachment are contemplated.

The roller controller assembly 18 is shown in FIGS. 9 through 12 as comprising first side assembly 70 and second side assembly 70'. The two side assemblies are substantially identical. As such, the first side assembly 70 will be described with the understanding that the second side assembly is substantially identical. Like structures utilize the same reference number augmented by a prime ('). The first side assembly includes fixed cam surface 72, adjustable cam surface 74, which are controlled by first movable cam surface adjustment assembly 76 and second movable cam surface adjustment assembly 78. It is contemplated that a greater or lesser number of adjustable cam surfaces may be provided, as well as a corresponding plurality of movable cam surface adjustment assemblies.

The fixed cam surface 72 extends from first end 73 to second end 75 along the upper member 34 of the first side 20, essentially alongside the upper opening 59, and inside of the surface upon which the drive belt 63 extends. The fixed cam surface is generally substantially planar, although not required to be as such, and is generally parallel to the outside surface upon which the sorting apparatus is positioned. In the embodiment shown, the fixed cam surface 72 comprises a single member that is coupled to the frame 12. As will be explained below, the first follower roller 56 is configured to roll along the fixed cam surface 72, thus establishing the profile of the roller members 50.

The adjustable cam surface 74 is positioned to the outside of the fixed cam surface extending generally along at least the length thereof and substantially parallel thereto. As such, the adjustable cam surface 74 is positioned along the upper member 34 of the first side 20 of the frame 12 so as to extend along upper opening 59. The adjustable cam surface 74 is positioned between the fixed cam surface 72 and the surface upon which the drive belt 63 extends. The adjustable cam surface 74 includes introductory cam surface 80, first movable cam surface 82, second movable cam surface 84 and conclusory cam surface 86. In the embodiment shown, the two central cam surfaces 82, 84 are movable, with the other cam surfaces being fixed. In other embodiments, additional movable cam surfaces can be employed between the introductory cam surface 80 and the conclusory cam surface 86. It will be explained below that the first follower roller 56' extends along the adjustable cam surface 74.

The introductory cam surface 80 extends from the first end 24 of the frame 12 toward the second end 26 a predetermined distance. In the embodiment shown, the introductory cam surface 80 is substantially parallel to and not vertically displaced from the fixed cam surface 72 (i.e., the relative height of the two surfaces is substantially the same).

The first movable cam surface 82 is shown in FIG. 11 as comprising an transition portion 83 and trailing portion 85. The transition portion 83 comprises an inclined surface that nests behind a mating configuration at the trailing end of the introductory cam surface 80. The trailing portion 85 is substantially planar and extends from the transition portion 83 to the end of the first movable cam surface. As will be explained below, the first movable cam surface can move vertically (at an angle) so that the relative height of the first movable cam surface can be varied so as to be any one of the same as the fixed cam surface, the same as the introductory cam surface 80 or higher than either of the surfaces. The transition portion 83 provides a gradual incline from the relative height of the introductory cam surface 80 to the height of the trailing portion 85 of the first movable cam surface.

The second movable cam surface 84 is shown in FIGS. 9 through 12 as comprising transition portion 77 and trailing portion 79. The transition portion 77 comprises an inclined surface that nests behind a mating configuration at the trailing end 85 of the first movable cam surface 82. The trailing portion 79 is substantially planar and extends from the transition portion 77 to the end of the first movable cam surface. The second movable cam surface 84 can move vertically (at an angle) so that the relative height of the second movable cam surface can be positioned at varied relative heights, such as the height of the introductory cam surface, the first movable cam surface or the conclusory cam surface, or at a point therebetween.

The conclusory cam surface 86 is shown as comprising transition portion 87 and arcuate portion 89. The transition portion 87 extends from the trailing end 79 of the second movable cam surface 84, and includes an inclined portion and a substantially planar portion. The arcuate portion 89 extends from the transition portion 87 and extends about the sprocket. As will be explained below, while not being limited thereto, the conclusory cam surface extends vertically further than the fixed cam surface 72, and generally corresponds to the distance of travel of the first axle 55' within the elongated opening 68 of the coupling blocks. As such, the greatest separation is achieved between the alternating roller member 50 and the roller member 50'. Of course, other configurations are contemplated, and the disclosed configuration is solely exemplary. The first side assembly includes fixed cam surface 72, adjustable cam surface 74, first movable cam surface adjustment assembly 76 and second movable cam surface adjustment assembly 78. It is contemplated that a greater or lesser number of adjustable cam surfaces may be provided, as well as a corresponding plurality of movable cam surface adjustment assemblies.

As set forth above, the second side assembly 70' is substantially identical to the first side assembly 70. In particular, the fixed cam surface 72' extends from first end 73' to second end 75' along the upper member 34' of the second side 20', essentially alongside the upper opening 59, opposite of the fixed cam surface 72, and a substantial mirror image thereof. Additionally, the fixed cam surface 72' extends inside of the surface upon which the drive belt 63' extends. The fixed cam surface corresponds to the opposing fixed cam surface and is generally substantially planar, although not required to be as such, and is generally parallel to the outside surface upon which the sorting apparatus is positioned. In the embodiment shown, the fixed cam surface 72' comprises a single member that is coupled to the frame 12. As will be explained below, the second follower roller 58 is configured to roll along the fixed cam surface 72', thus establishing the travelling profile of the roller members 50.

The adjustable cam surface 74' is positioned to the outside of the fixed cam surface 72' extending generally along at least the length thereof and substantially parallel thereto. As such, the adjustable cam surface 74' is positioned along the upper member 34' of the second side 20' of the frame 12 so as to extend along upper opening 59. The adjustable cam surface 74' is positioned between the fixed cam surface 72' and the surface upon which the drive belt 63' extends. The adjustable cam surface 74' includes introductory cam surface 80', first movable cam surface 82', second movable cam surface 84' and conclusory cam surface 86. In the embodiment shown, the two central cam surfaces 82', 84' are movable, with the other cam surfaces being fixed. In other embodiments, additional movable cam surfaces can be employed between the introductory cam surface 80' and the conclusory cam surface 86'. It will be explained below that the second follower roller 58' extends along the adjustable cam surface 74.

The introductory cam surface 80' extends from the first end 32' of the frame 12 toward the second end 33' a predetermined distance. In the embodiment shown, the introductory cam surface 80' is substantially parallel to and not vertically displaced from the fixed cam surface 72' (i.e., the relative height of the two surfaces is substantially the same).

The first movable cam surface 82' is shown as comprising an transition portion 83' and trailing portion 85'. The transition portion 83' comprises an inclined surface that nests behind a mating configuration at the trailing end of the introductory cam surface 80'. The trailing portion 85' is substantially planar and extends from the transition portion 83' to the end of the first movable cam surface. As will be explained below, the first movable cam surface can move vertically (at an angle) so that the relative height of the first movable cam surface can be varied so as to be any one of the same as the fixed cam surface, the same as the introductory cam surface 80' or higher than either of the surfaces. The transition portion 83' provides a gradual incline from the relative height of the introductory cam surface 80' to the height of the trailing portion 85' of the first movable cam surface.

The second movable cam surface 84' is shown as comprising transition portion 77' and trailing portion 79'. The transition portion 77' comprises an inclined surface that nests behind a mating configuration at the trailing end 85' of the first movable cam surface 82'. The trailing portion 79' is substantially planar and extends from the transition portion 77' to the end of the first movable cam surface. The second movable cam surface 84' can move vertically (at an angle) so that the relative height of the second movable cam surface can be positioned at varied relative heights, such as the height of the introductory cam surface, the first movable cam surface or the conclusory cam surface, or at a point therebetween.

The conclusory cam surface 86' is shown as comprising transition portion 87' and arcuate portion 89'. The transition portion 87' extends from the trailing end 79' of the second movable cam surface 84', and includes an inclined portion and a substantially planar portion. The arcuate portion 89' extends from the transition portion 87' and extends about the sprocket. As will be explained below, while not being limited thereto, the conclusory cam surface extends vertically further than the fixed cam surface 72', and generally corresponds to the distance of travel of second axle 57' within the elongated opening 68'(FIG. 6) of the coupling blocks. As such, the greatest separation is achieved between the alternating roller member 50 and the roller member 50'. Of course, other configurations are contemplated, and the disclosed configuration is solely exemplary.

The first movable cam surface adjustment assembly 76 includes adjustment axle 90, first adjustment arm 92 and second adjustment arm 92'. The first movable cam surface adjustment assembly is configured to simultaneously adjust the relative height of the first movable cam surfaces 82, 82' relative to the frame and relative to the fixed cam surfaces 72, 72'. The axle 90 is mounted on a first adjustment assembly cross member 44 which extends between the first side 20 and the second side 20' of the frame 12, generally spaced apart and above the upper opening 59 and in particular proximate the first movable cam surface. In the embodiment shown, the first adjustment assembly cross member 44 is spaced apart from the first movable cam surfaces 82, 82', as the vertical movement of the first movable cam surface is angled.

The axle 90 extends along the first adjustment assembly cross member 44 and includes handle 91 as well as gears 93, 93'. The gears 93, 93' are spaced apart from each other so as to be positioned to generally overlie the respective side 20, 20'. It will be understood that the handle 91 is mounted at one end of the axle 90, and in the embodiment shown, at the end corresponding to the first side 20. As the handle is turned, the gears will rotate in the direction of the handle. It is contemplated that the handle can be controlled through servo motors with control systems, or that it may be manually controlled.

The first adjustment arm 92 includes first telescoping component 94, second telescoping component 96, plate 98 and guide slots 105, 105'. The first telescoping component 94 is coupled to the first adjustment assembly cross member 44, and includes gear 95 at a first end thereof. The gear 95 meshes with the gear 93. As the gears comprise bevel gears, the two axles are at substantially right angles to each other. Opposite the gear 95, a threaded portion 97 is disposed. In the embodiment shown, the threaded portion is on the outside of the first telescoping component 94.

The second telescoping component 96 includes a threaded portion 101 which is internally threaded, and corresponds to the threaded portion 97 such that the two can threadingly engage each other. Opposite the threaded portion 97, a pivotable coupling 103 is disposed. It will be understood that the first and second telescoping components 94, 96 define a length between the gear 95 and the pivotable coupling 103. Relative rotation of the first component and the second component in a first direction increases the length, whereas rotation of the two components in a second direction decreases the length. The length can vary between a first extended configuration, and a second retracted configuration.

The pivotable coupling is attached to plate 98. The plate 98 is coupled to the first movable cam surface 82, and positioned on opposite sides of the upper member 34. The plate 98 includes a plurality of guide pins, 99, 99' which extend between the plate 98 and the first movable cam surface 82. The guide pins extend through corresponding slots 105, 105' of the upper member 34 of the frame 12. The guide pins are angled at an angle that substantially matches the angle of the first and second telescoping components 94, 96. Thus, rotation of the first pivotable component relative to the second component, slidably moves the pins 99, 99' along the corresponding guide slots 105, 105'. In turn, this adjusts the vertical position of the first movable cam surface.

The configuration of the second adjustment arm 92' is substantially identical to the configuration of the first adjustment arm 92, which is likewise controlled by movement of the adjustment axle 90. The second adjustment arm 92' includes first telescoping component 94', second telescoping component 96', plate 98' and guide slots 105', 105'. The first telescoping component 94' is coupled to the first adjustment assembly cross member 44, and includes gear 95' at a first end thereof. The gear 95' meshes with the gear 93'. As the gears comprise bevel gears, the two axles are at substantially right angles to each other. Opposite the gear 95', a threaded portion 97' is disposed. In the embodiment shown, the threaded portion is on the outside of the first telescoping component 94'.

The second telescoping component 96' includes a threaded portion 101' which is internally threaded, and corresponds to the threaded portion 97' such that the two can threadingly engage each other. Opposite the threaded portion 97', a pivotable coupling 103' is disposed. It will be understood that the first and second telescoping components 94', 96' define a length between the gear 95' and the pivotable coupling 103'. Relative rotation of the first component and the second component in a first direction increases the length, whereas rotation of the two components in a second direction decreases the length. The length can vary between a first extended configuration, and a second retracted configuration.

The pivotable coupling is attached to plate 98'. The plate 98' is coupled to the first movable cam surface 82', and positioned on opposite sides of the upper member 34. The plate 98' includes a plurality of guide pins, 99', 99' which extend between the plate 98' and the first movable cam surface 82'. The guide pins extend through corresponding slots 105, 105' of the upper member 34' of the frame 12. The guide pins are angled at an angle that substantially matches the angle of the first and second telescoping components 94', 96'. Thus, rotation of the first pivotable component relative to the second component, slidably moves the pins 99', 99' along the corresponding guide slots 105, 105'. In turn, this adjusts the vertical position of the first movable cam surface 76.

As the adjustment axle 90 is coupled to each of the first adjustment arm 92 and the second adjustment arm 92', and the two are configured to be substantially identical, the movements substantially match each other. As a result, the vertical position of the first movable cam surface 82 and the first movable cam surface 82' are linked and substantially identical.

Analogous to the first movable cam surface adjustment assembly 76, the second movable cam surface adjustment assembly 78 is configured to adjust the vertical position of the second movable cam surface 84, 84' relative to the respective fixed cam surface 72, 72'. The second movable cam surface 78 includes adjustment axle 190, first adjustment arm 192 and second adjustment arm 192'. The axle 190 is mounted on a second adjustment assembly cross member 46 which extends between the first side 20 and the second side 20' of the frame 12, generally spaced apart and above the upper opening 59 and in particular proximate the second movable cam surface. In the embodiment shown, the second adjustment assembly cross member 46 is spaced apart from the second movable cam surfaces 84, 84', as the vertical movement of the second movable cam surface is angled. In the embodiment shown, the first and second adjustment assembly cross members 44, 46 are substantially parallel to each other and spaced apart from each other.

The axle 190 extends along the second adjustment assembly cross member 46 and includes handle 191 as well as gears 193, 193'. The gears 193, 193' are spaced apart from each other so as to be positioned to generally overlie the respective side 20, 20'. It will be understood that the handle 191 is mounted at one end of the axle 190, and in the embodiment shown, at the end corresponding to the first side 20, and corresponding to the handle 91 of the first movable cam surface adjustment assembly 76. As the handle is turned, the gears will rotate in the direction of the handle. It is contemplated that the handle can be controlled through servo motors with control systems, or that it may be manually controlled.

The first adjustment arm 192 includes first telescoping component 194, second telescoping component 196, plate 198 and guide slots 205, 205'. The first telescoping component 194 is coupled to the second adjustment assembly cross member 44, and includes gear 195 at a first end thereof. The gear 195 meshes with the gear 193. As the gears comprise bevel gears, the two axles are at substantially right angles to each other. Opposite the gear 195, a threaded portion 197 is disposed. In the embodiment shown, the threaded portion is on the outside of the first telescoping component 194.

The second telescoping component 196 includes a threaded portion 201 which is internally threaded, and corresponds to the threaded portion 197 such that the two can threadingly engage each other. Opposite the threaded portion 197, a pivotable coupling 203 is disposed. It will be understood that the first and second telescoping components 194, 196 define a length between the gear 195 and the pivotable coupling 203. Relative rotation of the first component and the second component in a first direction increases the length, whereas rotation of the two components in a second direction decreases the length. The length can vary between a first extended configuration, and a second retracted configuration.

The pivotable coupling is attached to plate 198. The plate 198 is coupled to the first movable cam surface 182, and positioned on opposite sides of the upper member 134. The plate 198 includes a plurality of guide pins, 199, 199' which extend between the plate 198 and the first movable cam surface 82. The guide pins extend through corresponding slots 105, 105' of the upper member 34 of the frame 12. The guide pins are angled at an angle that substantially matches the angle of the first and second telescoping components 94, 96. Thus, rotation of the first pivotable component relative to the second component, slidably moves the pins 99, 99' along the corresponding guide slots 105, 105'. In turn, this adjusts the vertical position of the first movable cam surface.

The configuration of the second adjustment arm 192' is substantially identical to the configuration of the first adjustment arm 192, which is likewise controlled by movement of the adjustment axle 190. The second adjustment arm 192' includes first telescoping component 194', second telescoping component 196', plate 198' and guide slots 205, 205'. The first telescoping component 194' is coupled to the second adjustment assembly cross member 46, and includes gear 195' at a first end thereof. The gear 195' meshes with the gear 193'. As the gears comprise bevel gears, the two axles are at substantially right angles to each other. Opposite the gear 195', a threaded portion 197' is disposed. In the embodiment shown, the threaded portion is on the outside of the first telescoping component 194'.

The second telescoping component 196' includes a threaded portion 201' which is internally threaded, and corresponds to the threaded portion 197' such that the two can threadingly engage each other. Opposite the threaded portion 197', a pivotable coupling 203' is disposed. It will be understood that the first and second telescoping components 194', 196' define a length between the gear 195' and the pivotable coupling 203'. Relative rotation of the first component and the second component in a first direction increases the length, whereas rotation of the two components in a second direction decreases the length. The length can vary between a first extended configuration, and a second retracted configuration.

The pivotable coupling is attached to plate 198'. The plate 198' is coupled to the second movable cam surface 84', and positioned on opposite sides of the upper member 34'. The plate 198' includes a plurality of guide pins, 199', 199' which extend between the plate 198' and the second movable cam surface 84'. The guide pins extend through corresponding slots 205, 205' of the upper member 34' of the frame 12. The guide pins are angled at an angle that substantially matches the angle of the first and second telescoping components 194', 196'. Thus, rotation of the first pivotable component relative to the second component, slidably moves the pins 199, 199' along the corresponding guide slots 205, 205'. In turn, this adjusts the vertical position of the second movable cam surface 78'.

As the adjustment axle 190 is coupled to each of the first adjustment arm 192 and the second adjustment arm 192', and the two are configured to be substantially identical, the movements substantially match each other. As a result, the vertical position of the first movable cam surface 84 and the second movable cam surface 84' are linked and substantially identical.

The transport chute assembly 19 is shown in FIGS. 1, 2, 13 and 14 as comprising a plurality of belt chute assemblies, such as belt chute assemblies 110a-110d. Each of the belt chute assemblies are substantially identical. As such, the belt chute assembly 110a will be described with the understanding that the remaining belt chute assemblies are substantially identical. It will be understood that the conveyors are positioned as closely below as possible so as to minimize the vertical drop of the articles (such as berries and the like). Such a configuration tends to minimize damage to the different articles.

The belt chute assembly 110a includes frame 112a and belt system 114a. The frame 112a includes first opposing side 116a and second opposing side 118a, and a base guide, such as base guide 120a. The opposing sides 116a and 118a are substantially mirror images of each other and may include guide features embedded or attached thereto. The first and second opposing sides 116a, 118a define an outlet at one end thereof.

A belt system 114a is positioned so as to extend between the first and second opposing sides 116a, 118a along the length thereof. The belt system includes a belt 124a, belt drive motor 125a and flow control member 126a. It is contemplated that the belt is configured through the guide features to include a declined portion 130 so that the region of the belt that is below the upper opening 59 is closer to the roller members, with the rest of the belt being spaced further apart. The flow control member 126 comprises a flap with a plurality of vertical separations. The flow control member 126 precludes inadvertent rolling or bouncing of any articles positioned on the belt while the belt is in motion.

In the embodiment shown, a plurality of belt chute assemblies 110a through 110d are provided in a side by side orientation. The belt chute assemblies are positioned in a substantially side by side orientation and generally orthogonally positioned relative to the roller member rotation. As such, the belts 124a-124d move in a direction that is perpendicular to that of the roller members 50, 50'. Two of the belts 124a, 124c extend through the central opening 36 of the first side 20 with the outlets 122a, 122c being spaced apart from the first side. The other two belts 124b and 124d extend through the central opening 36' of the second side 20' with the outlets 122b, 122d being spaced apart from the second side. In the embodiment shown, the belts alternate from side to side so as to provide spacing on either side. It will be understood that alternate configurations are contemplated as well.

In operation, the operator first determines the different sizes that are desired for sorting. For example, in the embodiment shown, a total of four different sizes for sorting are permitted. The operation will be described with reference to the sorting of blueberries that are disposed through the product entry chute 25. The first region removes the blueberries that are smaller than the minimum size as well as any other small particles that have inadvertently been introduced into the system. The second region can be configured to separate a first size of desirable blueberries. The third region can be configured to separate a second, larger size of desirable blueberries. The fourth region can be configured to allow the passage of all of the remaining blueberries (i.e., very large blueberries).

To prepare the system, the user can adjust the second and third regions. That is, the first adjustable cam surface can be adjusted so as to have a larger passageway than the first region. The third region can be adjusted so as to have a larger passageway than the second region.

To achieve the same, the user first determines the desired size of the passageways. Once determined, the user moves the first movable cam surface. This is done by turning the handle 91 which turns the first telescoping component 94 in a first direction through gears 93, 95, telescopically inserting the first telescoping component into the second telescoping component 96. This effectively shortens the length of the adjustment arm 92. At the same time, the rotation of the handle turns second telescoping component 92' in a first direction through gears 93', 95', telescopically inserting the first telescoping component into the second telescoping component 96'. This effectively shortens the length of the adjustment arm 92'.

As the adjustment arm 92 and 92' are matched, the effective length shortening is identical. As the two arms are shortened, the plates 98, 98' move upwardly. The movement is coordinated by the guide pins 99, 99' sliding within the guide slots 105, 105'. As the plates 98, 98' are coupled to the first movable cam surfaces 82, 82', the cam surfaces rise upwardly from the fixed cam surfaces 72, 72'. When the surfaces rise, the roller members 50' which include first follower roller 56' and second follower roller 58' positioned on the first movable cam surfaces 82, 82', respectively, move upwardly. The alternating roller members 50 include follower rollers 56, and 58 which remain on the fixed cam surfaces 72, 72'. Thus, each alternating roller 50' is spaced further apart from a corresponding roller 50 than if the first movable cam surface was at the same level as the fixed cam surface.

Correspondingly, as the separation increases, the opening defined by the interference of the opposing surface indentations 53, 53' of adjacent pairs of the rollers increases. In turn, with an increase in the size of the defined passage.

The same procedure can be utilized with respect to the third region. In particular, to achieve the same, the user first determines the desired size of the passageways that will lead to the third belt chute assembly 110c. Once determined, the user moves the second movable cam surface. This is done by turning the handle 191 which turns the first telescoping component 194 in a first direction through gears 193, 195, telescopically inserting the first telescoping component into the second telescoping component 196. This effectively shortens the length of the adjustment arm 192. At the same time, the rotation of the handle turns second telescoping component 192' in a first direction through gears 193', 195', telescopically inserting the first telescoping component into the second telescoping component 196'. This effectively shortens the length of the adjustment arm 192'.

As the adjustment arm 192 and 192' are matched, the effective length shortening is identical. As the two arms are shortened, the plates 198, 198' move upwardly. The movement is coordinated by the guide pins 199, 199' sliding within the guide slots 205, 205'. As the plates 198, 198' are coupled to the second movable cam surfaces 84, 84', the cam surfaces rise upwardly from the fixed cam surfaces 72, 72'. When the surfaces rise, the roller members 50' which include first follower roller 56' and second follower roller 58' positioned on the second movable cam surfaces 84, 84', respectively, move upwardly. The alternating roller members 50 include follower rollers 56, and 58 which remain on the fixed cam surfaces 72, 72'. Thus, each alternating roller 50' is spaced further apart from a corresponding roller 50 than if the first movable cam surface was at the same level as the fixed cam surface. Additionally, the each alternating roller 50' is spaced further apart from the corresponding roller 50 than such an alternating roller on the first movable cam surface. Thus, the passageway is increased over that which was present at the second region.

Correspondingly, as the separation increases, the opening defined by the interference of the opposing surface indentations 53, 53' of adjacent pairs of the rollers increases. In turn, with an increase in the size of the defined passage. Again, this passageway is larger in the third region than in the second region.

Once the user has determined and set the different passageways, the system is ready to be utilized. The user activates the drive motor to initiate the movement of the belt. As the belt rotates, the coupling blocks rotate. As the roller member ends are captured within the blocks, the roller member likewise rotates with the belt. The roller member 50 of each of the coupling blocks is captured within the fixed axle openings 67, 67' with the first and second follower rollers 56, 58 rolling along the fixed cam surface.

At the same time, the alternating roller member 50' includes axles that extend through the elongated axle opening 68, 68' of each of the coupling blocks 64, 64', respectively. The associated first and second follower rollers 55', 57' travel along the adjustable cam surface 74.

The process for a pair of roller members 50, 50' will be described as these rollers start proximate the product entry chute 25 and make a full revolution around with the belt. Proximate the product entry chute 25, the roller members 50 and 50' are substantially collinear forming a substantially flat surface. Thus, the initial spacing of the roller members 50, 50' (as defined by the distance between the fixed axle 67, 67' opening and the elongated axle opening 68, 68') is the generally minimum spacing. The spacing defines a passageway between the surface indentations 53 and the immediately adjacent surface indentation 53'.

As the belt rotates, the roller member 50' reaches the end of the introductory cam surface 80 and reaches the beginning of the first movable cam surface. The roller member 50 continues along the fixed cam surface, while the roller member 50' hits the transition portion 83 and is directed upwardly toward the remainder of the first movable cam surface, elevated above the roller member 50. At the same time, roller member 50' upward movement and spacing vis-à-vis the roller member 50 is controlled by the shape of the elongated axle openings 68, 68'. Thus, the separation between adjacent roller members 50, 50' increases over the separation at the introductory cam surface.

As the belt continues to rotate, the roller member 50 continues along the fixed cam surfaces while the roller member 50' reaches the end of the first movable cam surfaces 82, 82' and begins movement along the second movable cam surfaces 84, 84'. In the embodiment shown, the movement along the second movable cam surface begins with the transition portion 77, 77' which directs the roller member 50' further vertically from its position at the end of the first movable cam surface 82. At the same time, the roller member 50' travels further upwardly along the elongated axle openings 68, 68'. Thus, the separation between adjacent roller members 50, 50' increases over the separation at the first movable cam surface.

As the belt continues to rotate, the roller member 50 continues along the fixed cam surfaces while the roller member 50' reaches the end of the second movable cam surfaces 84, 84' and begins movement along the conclusory cam surfaces 86, 86'. The configuration of the conclusory cam surface 86 is such that the roller members 50, 50' are further separated (in certain embodiments, the position of the roller members when roller members 50' extend along the conclusory cam surface are such that the roller members 50' are at the end of the elongated axle openings 68, 68'), and thus, at the further extreme of the separation of the roller members 50, 50'. It will be understood that while the roller members are proceeding along the cam surfaces, the roller members 50, 50' rotate about the first and second axles 55, 55', 57, 57' while translating across the upper opening 59.

The roller 50' continues around the arcuate portion 89 and then proceeds back underneath the belt chute assemblies 110a-d and back to the product entry chute 25. At the product entry chute 25, the roller member 50' returns to the initial position within the elongated axle openings 68, 68' proximate to the roller member 50.

For a quantity of differently sized blueberries disposed on the product entry chute, these blueberries are first directed onto the roller members 50, 50'. In the first region, the smallest berries that can fit in the passageways defined by the adjacent surface indentations 53, 53' of the adjacent roller members 50, 50' pass through the passageways, and drop onto the belt chute assembly 110d, and, in particular, upon the moving belt 124d. The moving belt 124d transports the blueberries that have dropped to further processing equipment.

Blueberries and other items that were too large to pass through the passageways in the first region continue to be transported on the roller members. At the second region, the spacing between the adjacent roller members 50, 50' is increased, thereby increasing the size of the passageways defined by adjacent surface indentations 53, 53'. Thus, blueberries that are smaller than the newly resized passageways pass through the passageways and drop onto the belt chute assembly 110c, and, ultimately, on the moving belt 124c. The moving belt 124c transports the blueberries that have dropped to further processing equipment.

Blueberries and other items that were too large to pass through the passageways in the second region continue to be transported on the roller members. At the third region, the spacing between the adjacent roller members 50, 50' is again increased, thereby increasing the size of the passageways defined by adjacent surface indentations 53, 53'. Thus, blueberries that are smaller than the again newly resized passageways pass through the passageways and drop onto the belt chute assembly 110b, and, ultimately, on the moving belt 124b. The moving belt 124b transports the blueberries that have dropped to further processing equipment.

Blueberries and other items that were too large to pass through the passageways in the third region continue to be transported on the roller members. At the conclusory region, the spacing between the adjacent roller members 50, 50' is again increased, which increases the size of the passageways defined by the adjacent surface indentations 53, 53'. Thus, the blueberries and other material that is now smaller than the passageways passes through the passageways and drops onto the belt chute assembly 110a, and, ultimately, on the moving belt 124a. The moving belt 124a transports the blueberries that have dropped to further processing equipment. In this region, many oddly shaped members, and foreign objects are passed through to the lower moving belt.

Any remaining items extend over the drive sprocket and exit the bottom of the equipment. It will be understood that the sizing of the passageways for each of the openings, is precisely controlled, as is the product that is first directed onto the product entry chute. As such, it is generally the case that the belt chute assemblies capture and direct virtually all of the product that is disposed on to the product entry chute.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A sorting apparatus comprising:
    a frame having a first side and a second side spaced apart from the first side, each of the first and second sides having a first end and a second end, the frame defining an upper opening spanning between the first and second sides;
    a sorting surface assembly comprising a plurality of roller members, defining alternating first roller members and second roller members, each one of the plurality of roller members consecutively positioned so as to extend between the first and second sides, and being substantially parallel to each other, and spanning across the upper cavity, each of the plurality of roller members having a first end and a second end, a first follower roller coupled to the first end and a second follower roller coupled to the second end;
    a roller control assembly including a first fixed cam surface positioned along the first side of the frame, extending between the first and second ends of the frame, a second fixed cam surface positioned along the second side of the frame extending between the first and second ends of the frame, and, a first side first movable cam surface positioned along the first side of the frame, extending between the first and second ends of the frame, and a second side first movable cam surface positioned along the second side of the frame, extending between the first and second ends of the frame, the first side first movable cam surface including a first movable cam surface, and the second side first movable cam surface including a first movable cam surface, substantially corresponding to the first movable cam surface of the first side first movable cam surface;

wherein, the first follower roller of each of the plurality of first roller members is associated with the first fixed cam surface with the second follower roller of each of the plurality of first roller members being associated with the second fixed cam surface, wherein the first follower roller of each of the plurality of second roller members is associated with the first movable cam surface with the second follower roller of each of the plurality of second roller members being associated with the second movable cam surface;

a first movable cam surface adjustment assembly coupled to the first side first movable cam surface and the second side first movable cam surface, the first movable cam surface adjustment assembly configured to move the first side first movable cam surface and the second side first movable cam surface so as to alter the position of the second roller members having respective first and second followers on the first and second side first movable cam surfaces, to, in turn, alter the spacing between adjacent first and second follower members; and a drive assembly configured to translate the plurality of first roller members and second roller members across the upper opening from the first side to the second side;

a first drive belt positioned on the first side with a portion of the first drive belt extending along the frame from the first end to the second end thereof and proximate the first fixed cam surface, with the first end of each of the plurality of first and second roller members coupled to the first drive belt whereupon movement of the first drive belt translates the first and second roller members across the upper opening from the first end to the second end of the frame; and a second drive belt positioned on the second side with a portion of the second drive belt extending along the frame from the first end to the second end thereof proximate the second fixed cam surface, with the second end of each of the plurality of first and second roller members coupled to the second drive belt whereupon movement of the second drive belt translates the first and second roller members across the opening from the first end to the second end of the frame.

2. The sorting apparatus of claim 1 wherein the first and second drive belts move in unison with each other.

3. The sorting apparatus of claim 1 wherein the drive assembly further comprises:

a plurality of coupling blocks extending from the first drive belt, each of the coupling blocks being positioned in a side by side orientation along the entirety of the second belt, each of the coupling blocks having a fixed axle opening capturing the first end of a successive first roller member, and an elongated axle opening which extends in a direction away from the drive belt capturing the first end of each of the second roller members; and a plurality of coupling blocks extending from the second drive belt, each of the coupling blocks being positioned in a side by side orientation along the entirety of the second belt, and corresponding to the coupling blocks of the first belt, each of the coupling blocks having a fixed axle opening capturing the second end of a successive first roller member, and an elongated axle opening which extends in a direction away from the drive belt capturing the second end of each of the second roller members.

4. The sorting apparatus of claim 3 wherein an elongated axle opening of the plurality of coupling blocks extends substantially perpendicular to the belt proximate the coupling block.

5. A sorting apparatus comprising:

a frame having a first side and a second side spaced apart from the first side, each of the first and second sides having a first end and a second end, the frame defining an upper opening spanning between the first and second sides;

a sorting surface assembly comprising a plurality of roller members, defining alternating first roller members and second roller members, each one of the plurality of roller members consecutively positioned so as to extend between the first and second sides, and being substantially parallel to each other, and spanning across the upper cavity, each of the plurality of roller members having a first end and a second end, a first follower roller coupled to the first end and a second follower roller coupled to the second end;

a roller control assembly including a first fixed cam surface positioned along the first side of the frame, extending between the first and second ends of the frame, a second fixed cam surface positioned along the second side of the frame extending between the first and second ends of the frame, and, a first side first movable cam surface positioned along the first side of the frame, extending between the first and second ends of the frame, and a second side first movable cam surface positioned along the second side of the frame, extending between the first and second ends of the frame, the first side first movable cam surface including a first movable cam surface, and the second side first movable cam surface including a first movable cam surface, substantially corresponding to the first movable cam surface of the first side first movable cam surface;

wherein, the first follower roller of each of the plurality of first roller members is associated with the first fixed cam surface with the second follower roller of each of the plurality of first roller members being associated with the second fixed cam surface, wherein the first follower roller of each of the plurality of second roller members is associated with the first movable cam surface with the second follower roller of each of the plurality of second roller members being associated with the second movable cam surface;

a first movable cam surface adjustment assembly coupled to the first side first movable cam surface and the second side first movable cam surface, the first movable cam surface adjustment assembly configured to move the first side first movable cam surface and the second side first movable cam surface so as to alter the position of the second roller members having respective first and second followers on the first and second side first movable cam surfaces, to, in turn, alter the spacing between adjacent first and second follower members; and a drive assembly configured to translate the plurality of first roller members and second roller members across the upper opening from the first side to the second side;

wherein the first movable cam surface adjustment assembly comprises:
an adjustment axle rotatably positioned relative to the frame, and including a first gear and a second gear, the first gear positioned proximate the first side and the second gear positioned proximate the second side;
a first adjustment arm having a first end including a gear configured to matingly mesh with the first gear of the adjustment arm and having a second end spaced apart therefrom and coupled to the first side first movable cam surface, whereupon rotation of the first adjustment arm corresponds to translative movement of the first side first movable cam surface;
a second adjustment arm having a first end including a gear configured to matingly mesh with the second gear of the adjustment arm and having a second end spaced apart therefrom and coupled to the second side first movable cam surface, whereupon rotation of the second adjustment arm corresponds to translative movement of the second side first movable cam surface.

6. The sorting apparatus of claim 5 wherein:
the first adjustment arm comprises a first telescoping component having the gear positioned at the first end thereof, and a second telescoping component having a second end coupled to the first side first movable cam surface, the second end of the first telescoping component being rotatably coupled to the first end of the second telescoping component, such that relative rotation of the first telescoping component translates the first telescoping component relative to the second telescoping component, thereby changing the length of the first adjustment arm; and
the second adjustment arm comprises a first telescoping component having the gear positioned at the first end thereof, and a second telescoping component having a second end coupled to the second side first movable cam surface, the second end of the first telescoping component being rotatably coupled to the first end of the second telescoping component, such that relative rotation of the first telescoping component translates the first telescoping component relative to the second telescoping component, thereby changing the length of the second adjustment arm.

7. The sorting apparatus of claim 6 wherein:
the first side of the frame includes a pair of slots extending therethrough, the pair of slots extending in an upward direction, and further including a first plate that is coupled to the first side first movable cam surface by way of a pair of pins, each pin extending through one of the pair of slots in the first side of the frame, with the second end of the second telescoping component being coupled to the first plate and movable therewith, whereupon rotational movement of the first telescoping component of the first adjustment arm moves the first plate, and in turn, the pins along the pair of slots; and
the second side of the frame includes a pair of slots extending therethrough, the pair of slots extending in an upward direction, and further including a second plate that is coupled to the second side first movable cam surface by way of a pair of pins, each pin extending through one of the pair of slots in the second side of the frame, with the second end of the second telescoping component being coupled to the second plate and movable therewith, whereupon rotational movement of the first telescoping component of the second adjustment arm moves the second plate, and in turn, the pins along the pair of slots.

8. The sorting apparatus of claim 6 further comprising a transport chute assembly having a belt chute assembly extending below the roller members extending along the first side first movable cam surface and the second side first movable cam surface, with the belt chute assembly extending toward one of the first and second sides of the frame.

9. The sorting apparatus of claim 8 wherein the belt chute assembly extends beyond the first side of the frame, through a central opening defined in the first side of the frame, and in a direction that is at least one of oblique to and perpendicular to the movement of the roller members across the upper opening.

10. A sorting apparatus comprising:
a frame having a first side and a second side spaced apart from the first side, each of the first and second sides having a first end and a second end, the frame defining an upper opening spanning between the first and second sides;
a sorting surface assembly comprising a plurality of roller members, defining alternating first roller members and second roller members, each one of the plurality of roller members consecutively positioned so as to extend between the first and second sides, and being substantially parallel to each other, and spanning across the upper cavity, each of the plurality of roller members having a first end and a second end, a first follower roller coupled to the first end and a second follower roller coupled to the second end;
a roller control assembly including a first fixed cam surface positioned along the first side of the frame, extending between the first and second ends of the frame, a second fixed cam surface positioned along the second side of the frame extending between the first and second ends of the frame, and, a first side first movable cam surface positioned along the first side of the frame, extending between the first and second ends of the frame, and a second side first movable cam surface positioned along the second side of the frame, extending between the first and second ends of the frame, the first side first movable cam surface including a first movable cam surface, and the second side first movable cam surface including a first movable cam surface, substantially corresponding to the first movable cam surface of the first side first movable cam surface;
wherein, the first follower roller of each of the plurality of first roller members is associated with the first fixed cam surface with the second follower roller of each of the plurality of first roller members being associated with the second fixed cam surface, wherein the first follower roller of each of the plurality of second roller members is associated with the first movable cam surface with the second follower roller of each of the plurality of second roller members being associated with the second movable cam surface;
a first movable cam surface adjustment assembly coupled to the first side first movable cam surface and the second side first movable cam surface, the first movable cam surface adjustment assembly configured to move the first side first movable cam surface and the second side first movable cam surface so as to alter the position of the second roller members having respective first and second followers on the first and second side first movable cam surfaces, to, in turn, alter the spacing between adjacent first and second follower members;

a drive assembly configured to translate the plurality of first roller members and second roller members across the upper opening from the first side to the second side;

a first side introductory cam surface which is fixed to the frame and precedes the first side first movable cam surface; and a second side introductory cam surface which is fixed to the frame and precedes the second side first movable cam surface.

11. The sorting apparatus of claim 10 further comprising a first side conclusory cam surface which is fixed to the frame and follows the first side first movable cam surface, and, a second side conclusory cam surface which is fixed to the frame and follows the second side first movable cam surface.

12. A sorting apparatus comprising:

a frame having a first side and a second side spaced apart from the first side, each of the first and second sides having a first end and a second end, the frame defining an upper opening spanning between the first and second sides;

a sorting surface assembly comprising a plurality of roller members, defining alternating first roller members and second roller members, each one of the plurality of roller members consecutively positioned so as to extend between the first and second sides, and being substantially parallel to each other, and spanning across the upper cavity, each of the plurality of roller members having a first end and a second end, a first follower roller coupled to the first end and a second follower roller coupled to the second end;

a roller control assembly including a first fixed cam surface positioned along the first side of the frame, extending between the first and second ends of the frame, a second fixed cam surface positioned along the second side of the frame extending between the first and second ends of the frame, and, a first side first movable cam surface positioned along the first side of the frame, extending between the first and second ends of the frame, and a second side first movable cam surface positioned along the second side of the frame, extending between the first and second ends of the frame, the first side first movable cam surface including a first movable cam surface, and the second side first movable cam surface including a first movable cam surface, substantially corresponding to the first movable cam surface of the first side first movable cam surface;

wherein, the first follower roller of each of the plurality of first roller members is associated with the first fixed cam surface with the second follower roller of each of the plurality of first roller members being associated with the second fixed cam surface, wherein the first follower roller of each of the plurality of second roller members is associated with the first movable cam surface with the second follower roller of each of the plurality of second roller members being associated with the second movable cam surface;

a first movable cam surface adjustment assembly coupled to the first side first movable cam surface and the second side first movable cam surface, the first movable cam surface adjustment assembly configured to move the first side first movable cam surface and the second side first movable cam surface so as to alter the position of the second roller members having respective first and second followers on the first and second side first movable cam surfaces, to, in turn, alter the spacing between adjacent first and second follower members; and a drive assembly configured to translate the plurality of first roller members and second roller members across the upper opening from the first side to the second side;

wherein the roller control assembly further comprises a first side second movable cam surface positioned sequentially after the first side first movable cam surface, and a second side second movable cam surface positioned sequentially after the second side first movable cam surface;

with the sorting apparatus further comprising a second movable cam surface adjustment assembly coupled to the first side second movable cam surface and coupled to the second side second movable cam surface so as to alter the position of the second roller members having respective first and second followers, so as to alter the spacing between adjacent first and second follower members.

13. The sorting apparatus of claim 12 wherein the second movable cam surface adjustment assembly comprises:

an adjustment axle rotatably positioned relative to the frame, and including a first gear and a second gear, the first gear positioned proximate the first side and the second gear positioned proximate the second side;

a first adjustment arm having a first end including a gear configured to matingly mesh with the first gear of the adjustment arm and having a second end spaced apart therefrom and coupled to the first side second movable cam surface, whereupon rotation of the first adjustment arm corresponds to translative movement of the first side second movable cam surface;

a second adjustment arm having a first end including a gear configured to matingly mesh with the second gear of the adjustment arm and having a second end spaced apart therefrom and coupled to the second side second movable cam surface, whereupon rotation of the second adjustment arm corresponds to translative movement of the second side second movable cam surface.

14. The sorting apparatus of claim 13 wherein:

the first adjustment arm comprises a first telescoping component having the gear positioned at the first end thereof, and a second telescoping component having a second end coupled to the first side second movable cam surface, the second end of the first telescoping component being rotatably coupled to the first end of the second telescoping component, such that relative rotation of the first telescoping component translates the first telescoping component relative to the second telescoping component, thereby changing the length of the first adjustment arm; and the second adjustment arm comprises a first telescoping component having the gear positioned at the first end thereof, and a second telescoping component having a second end coupled to the second side second movable cam surface, the second end of the first telescoping component being rotatably coupled to the first end of the second telescoping component, such that relative rotation of the first telescoping component translates the first telescoping component relative to the second telescoping component, thereby changing the length of the second adjustment arm.

15. The sorting apparatus of claim 14 further comprising a transport chute assembly having a belt chute assembly extending below the roller members extending along the first side second movable cam surface and the second side second movable cam surface, with the belt chute assembly extending toward one of the first and second sides of the frame.

* * * * *